United States Patent Office 3,095,439
Patented June 25, 1963

1

3,095,439
S,S-DIPROPYL O-METHYL PHOSPHORODITHIOITE
Thomas Mason Melton, Richmond Va., assignor to Virginia-Carolina Chemical Corporation, Richmond, Va., a corporation of Virginia
No Drawing. Filed Feb. 2, 1962, Ser. No. 170,795
1 Claim. (Cl. 260—461)

This invention concerns a new organophosphorus compound and a process for its manufacture. More particularly, it relates to S,S-dipropyl O-methyl phosphorodithioite, a liquid which is soluble in many organic solvents, but substantially insoluble in water.

The material is useful as the active component of insecticidal formulations, and it is particularly adapted for use as an insecticide either in dust or liquid formulations. While the new compound is a good general insecticide, it is especially useful in the control of agricultural pests. Formulations containing it may be prepared by mixing it with other liquids, or with finely divided solid vehicles or extenders, the liquids or finely divided solid vehicles or extenders having therein minor amounts of the compound. For example, the compound may be mixed with any finely divided solid carrier which will aid in its uniform distribution. As a general rule, solid carriers which are acceptable are those which are non-hygroscopic, thereby preventing the combination from caking. Some useful solid carriers are finely divided kaolinite, bentonite, attapulgite and the like.

The new product may be used also in oils, or as a component in water emulsions or water dispersions. An effective liquid formulation includes the compound, a volatile, non-phytotoxic solvent, water, and a small amount of a surface active agent such as Tween-20 (polyoxyethylene sorbitan monolaurate).

When treating for insects, it is necessary only to apply sufficient of the formulation to assure contact with the pests. For example, when treating plants infested with insects, control can be achieved by dusting in the same manner as for other materials such as DDT, or by spraying a liquid formulation just to the point of run off.

The new compound of this invention may be prepared by reacting an S,S-dipropyl phosphorohalidodithioite with methyl alcohol in an inert organic solvent, using an organic tertiary amine as the acid acceptor. Good results are obtained when using equivalent quantities of S,S-dipropyl phosphorohalidodithioite, methanol and acid acceptor, but a slight excess of methanol and acid acceptor is preferable. The reaction is somewhat exothermic, and external cooling will be necessary, particularly at the lower temperatures. With respect to the reaction temperature, it has been found that the reaction proceeds well at 0–5° C., but it may be run up to 50° C., without any appreciable effect on the yield. After the reaction is complete, the product may be separated conventionally, i.e., removing the hydrochloride by filtration, washing the mixture, or a combination of these. After removal of the hydrochloride and other impurities, the solvent is fractionally distilled to yield the product as a liquid residue.

As indicated above, the reaction is preferably run in the presence of an inert organic solvent and an amine. Hexane was used in reducing the invention to practice, but it will be readily apparent that other solvents, such as benzene, are also useful. Examples of useful amines are triethyl-, tripropyl-, tributylamine, pyridine and the like.

Having described the compound in a general way, the following will specifically illustrate its preparation. Parts are by weight.

S,S-Dipropyl O-Methyl Phosphorodithioite
$(C_3H_7S)_2PCl + CH_3OH + (C_2H_5)_3N$
$\rightarrow (C_3H_7S)_2POCH_3 + (C_2H_5)_3N \cdot HCl$ Fifty-four parts (0.25 mol) of $(C_3H_7S)_2PCl$ was added at 0–5° C. over a period of 30 minutes to a mixture of 12 parts of methyl alcohol and 38 parts of triethylamine in hexane. The reaction was allowed to stir for an additional hour at the reaction temperature. The mass was warmed and filtered to remove the amine hydrochloride. After filtration, the hexane was fractionated, first at atmospheric pressure and a slightly elevated temperature, then to 30 mm. of Hg at a final pot temperature of 100° C. The residue was distilled at 10 mm. of Hg, yielding the product boiling at 130–140° C. The product had the following properties:

Refractive index at 24° C.—1.5272;
Specific gravity at 20°/4° C.—1.064;
P (calculated) 14.6%; P (found) 14.69%;
S (calculated) 30.2%; S (found) 30.71.%

The $(C_3H_7S)_2PCl$ was obtained by reacting propyl mercaptan with $PCl_3$, in the ratio of 2:1, at a temperature of 25–30° C. The mixture was allowed to stand for about 12 hours, after which time the product was separated by fractionally distilling the residue at 5 mm. of Hg to a boiling point of about 14° C.

I claim:
S,S-dipropyl O-methyl phosphorodithioite.

References Cited in the file of this patent
UNITED STATES PATENTS
2,955,803   Goyette _____ Oct. 11, 1960

OTHER REFERENCES
Kosolapoff: "Organo-Phosphorus Compounds," (1950), p. 184, John Wiley and Sons, New York.

UNITED STATES PATENT OFFICE
CERTIFICATE OF CORRECTION

Patent No. 3,095,439            June 25, 1963

Thomas Mason Melton

It is hereby certified that error appears in the above numbered patent requiring correction and that the said Letters Patent should read as corrected below.

Column 2, line 37, for "30.71.%" read -- 30.71% --; line 43, for "14° C." read -- 140° C. --.

Signed and sealed this 31st day of December 1963.

(SEAL)
Attest:
ERNEST W. SWIDER            EDWIN L. REYNOLDS

Attesting Officer            Acting Commissioner of Patents